(12) United States Patent
Juni

(10) Patent No.: US 7,941,017 B2
(45) Date of Patent: May 10, 2011

(54) OPTICAL TOUCH PANEL AND METHOD FOR MANUFACTURING THE SAME

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/425,643

(22) Filed: Apr. 17, 2009

(65) Prior Publication Data
US 2010/0002995 A1 Jan. 7, 2010

(30) Foreign Application Priority Data
Jul. 1, 2008 (JP) ................. 2008-172517

(51) Int. Cl.
G02B 6/32 (2006.01)
G02B 6/10 (2006.01)
G06F 3/042 (2006.01)

(52) U.S. Cl. ........... 385/33; 385/131; 345/175; 345/176
(58) Field of Classification Search ............. 385/14, 385/33, 50, 129–132; 345/173, 175, 176
See application file for complete search history.

(56) References Cited

U.S. PATENT DOCUMENTS

| 7,099,534 | B2 | 8/2006 | Kato et al. | |
|---|---|---|---|---|
| 7,359,594 | B2 | 4/2008 | Nishizawa et al. | |
| 7,509,011 | B2 | 3/2009 | Payne | |
| 7,676,131 | B2 * | 3/2010 | Luo | 385/129 |
| 7,786,983 | B2 | 8/2010 | Graham | |
| 7,805,036 | B2 | 9/2010 | Juni | |
| 7,811,640 | B2 | 10/2010 | Charters et al. | |
| 2004/0120672 | A1 | 6/2004 | Chong et al. | |
| 2004/0201579 | A1 | 10/2004 | Graham | |
| 2005/0058399 | A1 | 3/2005 | Nishizawa et al. | |
| 2005/0175306 | A1 | 8/2005 | Chong et al. | |
| 2005/0201681 | A1 | 9/2005 | Payne | |
| 2005/0271326 | A1 | 12/2005 | Luo | |
| 2005/0271983 | A1 * | 12/2005 | Payne | 430/321 |
| 2007/0258691 | A1 | 11/2007 | Charters et al. | |
| 2008/0031584 | A1 | 2/2008 | Payne | |
| 2008/0198144 | A1 | 8/2008 | Shimizu et al. | |
| 2008/0252620 | A1 * | 10/2008 | Shimizu | 345/176 |
| 2009/0128519 | A1 | 5/2009 | Juni | |
| 2010/0001979 | A1 | 1/2010 | Juni | |

FOREIGN PATENT DOCUMENTS

| EP | 1980936 A2 | 10/2008 |
|---|---|---|
| JP | 63-021610 A | 1/1988 |
| JP | 2003-004960 A | 1/2003 |
| JP | 2004-295644 A | 10/2004 |
| JP | 2008203431 A * | 9/2008 |
| WO | 2007/128041 A1 | 11/2007 |
| WO | 2008/016618 A2 | 2/2008 |

OTHER PUBLICATIONS

European Search Report dated Nov. 9, 2009, issued in correspond European Patent Application No. 09163498.0.

* cited by examiner

*Primary Examiner* — Daniel Petkovsek
(74) *Attorney, Agent, or Firm* — Westerman, Hattori, Daniels & Adrian, LLP

(57) ABSTRACT

An optical touch panel having over-cladding layers each integrated with a lens-shaped portion (i.e., optical waveguides each having a lens-integrated over-cladding layer). The optical touch panel requires neither lens assembly nor optical axis alignment, and is therefore free from the fear that the displacement of lenses will occur. This makes it possible to achieve high optical transmission efficiency and high impact resistance.

12 Claims, 6 Drawing Sheets

OPTICAL TOUCH PANEL AND METHOD FOR MANUFACTURING THE SAME

BACKGROUND OF THE INVENTION

1. Field of the Invention

The present invention relates to an optical touch panel which enables coordinate input by a finger or a pen and includes a display screen (i.e., a coordinate input region), such as a liquid crystal panel or the like, and a light-emitting element, a light-receiving element, and an optical waveguide which are provided around the display screen.

2. Description of Related Art

A known conventional optical touch panel (i.e., a coordinate input device) includes an optical waveguide and microlenses (see, for example, Japanese Unexamined Patent Publication No. 2004-295644). An optical waveguide is light in weight and enables high-speed signal transmission, and is therefore expected to be used in various electronic devices in future. However, such a conventional optical touch panel uses a large number of optical parts, such as mirrors and lenses or the like, and therefore requires complicated assembly and alignment. Further, displacement of such optical parts is likely to occur, and there is a case where high optical transmission efficiency cannot be achieved.

It is therefore an object of the present invention to provide an optical touch panel which includes an optical waveguide, has a small number of optical parts, and is easy to assemble and perform alignment.

SUMMARY OF THE INVENTION

The inventor of the present invention has extensively studied, and as a result, has found that the use of an optical waveguide whose over-cladding layer has a lens-shaped distal end portion (i.e., an optical waveguide having a lens-integrated over-cladding layer) makes it possible to obtain an optical touch panel having a small number of parts and excellent optical transmission characteristics.

In a first preferred embodiment, an optical touch panel according to the present invention comprises: a coordinate input region; a light-emitting element; a light-receiving element; a light-emitting sided-optical waveguide connected to the light-emitting element and having an output end; and a light-receiving sided-optical waveguide connected to the light-receiving element and having an input end, wherein the output end of the light-emitting sided-optical waveguide and the input end of the light-receiving sided-optical waveguide are located on opposite sides of the coordinate input region, the light-emitting sided-optical waveguide and the light-receiving sided-optical waveguide each have an under-cladding layer, a plurality of cores provided on the under-cladding layer, and an over-cladding layer covering the cores and the under-cladding layer, the under-cladding layer and the over-cladding layer each have a lower refractive index than the cores, the over-cladding layer of the light-emitting sided-optical waveguide has an output end and the over-cladding layer of the light-receiving sided-optical waveguide has an input end, and at least one of the output end of the over-cladding layer and the input end of the over-cladding layer has a lens shape.

In a second preferred embodiment of the optical touch panel according to the present invention, light beams emitted from distal ends of the cores of the light-emitting sided-optical waveguide are converted by a lens-shaped portion of the output end of the over-cladding layer into collimated light beams directed toward the input end of the light-receiving sided-optical waveguide, and the collimated light beams incident on the input end of the light-receiving sided-optical waveguide are converted by a lens-shaped portion of the input end of the over-cladding layer into convergent light beams directed toward ends of the cores.

In a third preferred embodiment of the optical touch panel according to the present invention, the lens-shaped portion of the output end of the over-cladding layer and the lens-shaped portion of the input end of the over-cladding layer are each a long lens having a cross-sectional shape of substantially a quarter of a circle.

In a fourth preferred embodiment, the optical touch panel according to the present invention further comprises an input-output interface.

In a fifth preferred embodiment, a computer apparatus according to the present invention comprises the optical touch panel described above.

In a sixth preferred embodiment, a method for manufacturing the optical touch panel according to the present invention comprises the steps of: forming the cores on a surface of the under-cladding layer by patterning; placing a molding die on the surface of the under-cladding layer so as to cover the cores; injecting a material for forming the over-cladding layer into the molding die; and solidifying or curing the material to form the over-cladding layer.

ADVANTAGE OF THE INVENTION

As described above, since the optical touch panel according to the present invention has a lens-integrated over-cladding layer, it is possible to eliminate the necessity for performing lens assembly and optical axis alignment and therefore to eliminate the fear that the displacement of lenses will occur. This makes it possible to achieve high optical transmission efficiency and high impact resistance.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
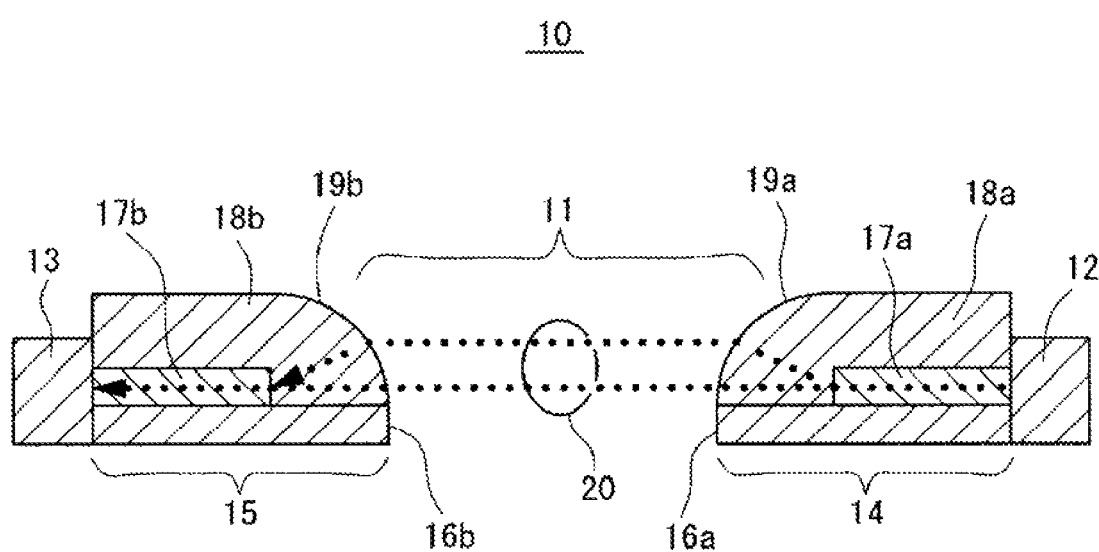
FIG. 1 is a sectional view of a main part of an optical touch panel according to the present invention.

The preferred embodiments of the present invention will now be described with reference to FIGS. 1-8 of the drawings. Identical elements in the various figures are designated with the same reference numerals.

<Optical Touch Panel>

As shown in FIG. 1 (sectional view), an optical touch panel 10 of the present invention comprises: a coordinate input region 11; a light-emitting element 12; a light-receiving element 13; a light-emitting sided-optical waveguide 14 connected to the light-emitting element 12; and a light-receiving sided-optical waveguide 15 connected to the light-receiving element 13. The light-emitting sided-optical waveguide 14 has an output end portion 19a (hereinafter, also referred to as a "distal end portion 19a") and the light-receiving sided-optical waveguide 15 has an input end portion 19b (hereinafter, also referred to as a "distal end potion 19b"). The output end portion 19a and the input end portion 19b are located on the opposite sides of the coordinate input region 11. The light-emitting sided-optical waveguide 14 has an under-cladding layer 16a, a plurality of cores 17a provided on the under-cladding layer 16a, and an over-cladding layer 18a covering the under-cladding layer 16a and the cores 17a. The light-receiving sided-optical waveguide 15 has an under-cladding layer 16b, a plurality of cores 17b provided on the under-cladding layer 16b, and an over-cladding layer 18b covering the under-cladding layer 16b and the cores 17b. The under-cladding layers 16a and 16b and the over-cladding layers 18a and 18b each have a lower refractive index than the cores 17a and 17b. The output end portion 19a of the over-cladding layer 18a of the light-emitting sided-optical waveguide 14 and the input end portion 19b of the over-cladding layer 18b of the light-receiving sided-optical waveguide 15 each have a lens shape (i.e., a shape corresponding to a semi-lenticular lens).

As described above, the optical touch panel 10 of the present invention includes the light-emitting element 12 and the light-receiving element 13. The light-emitting sided-optical waveguide 14 is connected to the light-emitting element 12 at the proximal ends of the cores 17a. As the light-emitting element 12, for example, a vertical-cavity surface-emitting laser (VCSEL) can be used. The light-receiving sided-optical waveguide 15 is connected to the light-receiving element 13 at the proximal ends of the cores 17b. As the light-receiving element 13, for example, a CMOS sensor can be used.

In the optical touch panel 10 of the present invention, light (indicated by the dotted lines in FIG. 1) emitted from the light-emitting element 12 passes through the light-emitting sided-optical waveguide 14, emanates therefrom through the distal end portion 19a, crosses the coordinate input region 11, enters the light-receiving sided-optical waveguide 15 through the distal end portion 19b, passes through the light-receiving sided-optical waveguide 15, and reaches the light-receiving element 13. When part of light crossing the coordinate input region 11 is blocked by a finger or a pen, the intensity of the light received by the light-receiving element 13 is reduced. By detecting such a reduction in light intensity, it is possible to determine the coordinates of the position of the finger or pen.

A light beam emitted from the distal end of each of the cores 17a of the light-emitting sided-optical waveguide 14 has a certain divergence angle, but is converted by the lens-shaped distal end portion 19a of the over-cladding layer 18a into a collimated light beam 20 directed toward the light-receiving sided-optical waveguide 15. The collimated light beam 20 incident on the light-receiving sided-optical waveguide 15 is converted by the lens-shaped distal end portion 19b of the over-cladding layer 18b into a converging light beam directed toward the distal end of the core 17b. In this way, light beams emitted from the light-emitting element 12 efficiently reach the light-receiving element 13 without dispersing on their way to the light-receiving element 13.

A conventional optical touch panel requires optical axis alignment because it is manufactured by assembling optical waveguides and optical parts (e.g., lenses and mirrors) separately prepared. In this case, misalignment of the optical axes of the optical parts is likely to occur. When optical axis misalignment occurs, optical transmission efficiency is reduced. However, as described above, the optical touch panel of the present invention has a lens-integrated over-cladding layer, and therefore it is possible to eliminate the necessity for assembling optical waveguides and optical parts and performing optical axis alignment. In addition, there is no fear that the displacement of lenses will occur. This improves optical transmission efficiency and impact resistance.

Figure 2:
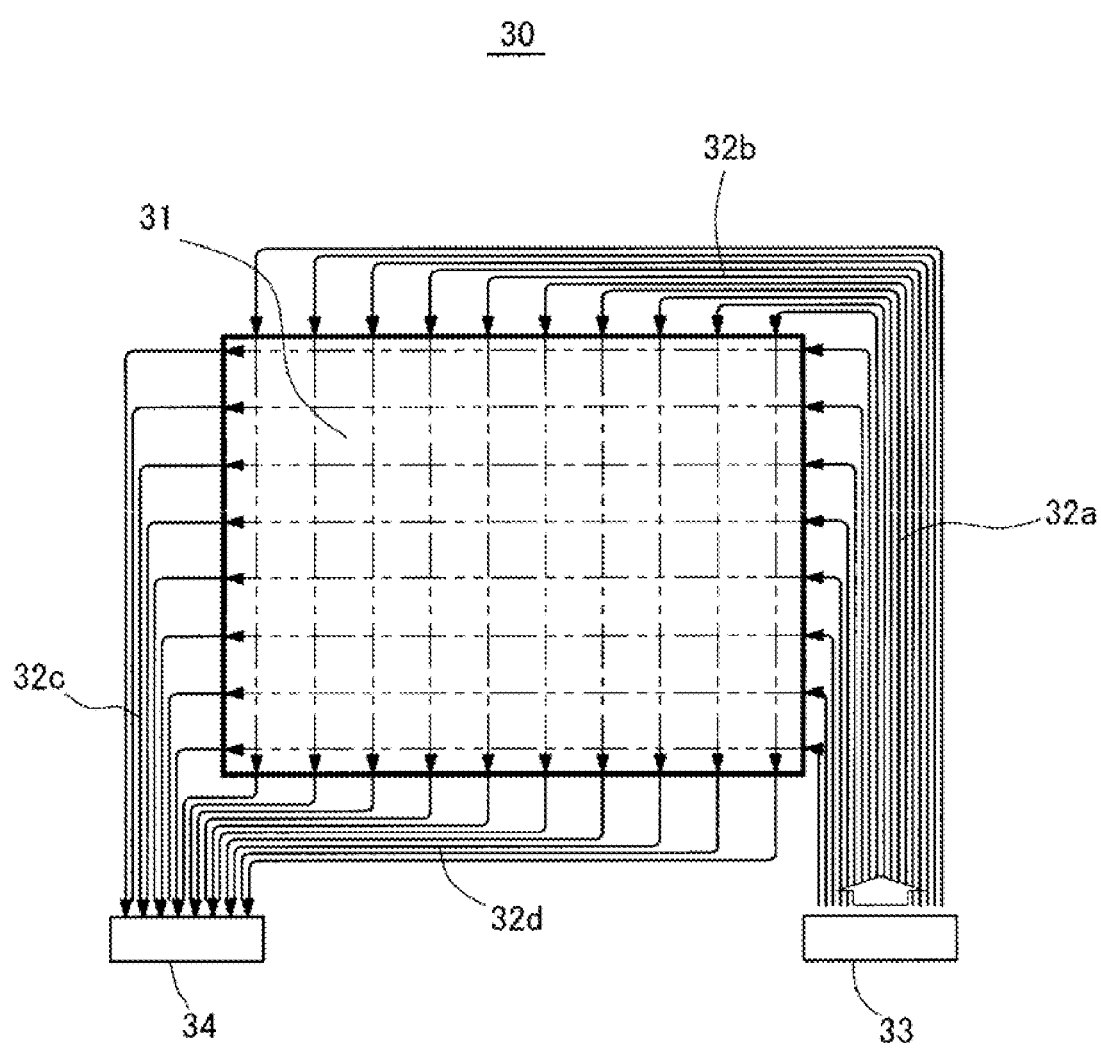
FIG. 2 is a plan view of the main part of the optical touch panel according to the present invention.

As shown in FIG. 2 (plan view), an optical touch panel 30 of a preferred embodiment of the present invention has optical waveguides 32a, 32b, 32c, and 32d provided around a rectangular coordinate input region 31. More specifically, the light-emitting sided-optical waveguides 32a and 32b provided along adjacent two sides of the coordinate input region 31 are connected to a light-emitting element 33 at their proximal ends, and the light-receiving sided-optical waveguides 32c and 32d provided along the other adjacent two sides of the coordinate input region 31 are connected to a light-receiving element 34 at their proximal ends. Such a structure allows the optical touch panel 30 of the present invention to detect two-dimensional coordinates.

<Coordinate Input Region>

In the present invention, the word "coordinate input region" refers to a region for performing coordinate input by a finger or a pen. The coordinate input region is typified by, for example, a display screen such as a liquid crystal panel or a plasma panel. The coordinate input region of the optical touch panel of the present invention has no sensors because an optical waveguide, a light-emitting element, and a light-receiving element to be provided around the coordinate input region function as sensors. Unlike resistive touch panels and capacitance type touch panels, the coordinate input region of the optical touch panel of the present invention does not need to have an overlay layer, such as an ITO film, serving as a sensor, and therefore an open space may be provided in front of the coordinate input region. Alternatively, a glass panel or an acrylic plate may be provided on the surface of the coordinate input region to improve scratch resistance. As described above, since the coordinate input region of the optical touch panel of the present invention does not need to have an overlay layer, brightness and sharpness of a liquid crystal panel or a plasma panel are not impaired.

As described above, in the optical touch panel of the present invention, light beams crossing the coordinate input region are collimated light beams converted by a lens, which is integrated with the over-cladding layer and provided at the distal end of the light-emitting sided-optical waveguide, so as to be directed toward the light-receiving sided-optical waveguide (It is to be noted that in this specification, the word "collimated light beam" refers to not only a geometrically perfectly collimated light beam but also an approximately collimated light beam. The word "approximately collimated light beam" refers to a collimated light beam having a divergence angle of 10° or less). This makes it possible to increase the size of the coordinate input region and therefore to manufacture a larger optical touch panel. The coordinate input region of the optical touch panel of the present invention can have a diagonal size of, for example, 2 to 50 inches.

<Optical Waveguide>

As described above, the light-emitting sided-optical waveguide and the light-receiving sided-optical waveguide to be used in the present invention each have an under-cladding layer, a plurality of cores provided on the under-cladding layer, and an over-cladding layer covering the cores and the under-cladding layer. At least one of the over-cladding layer of the light-emitting sided-optical waveguide and the over-cladding layer of the light-receiving sided-optical waveguide has a lens-shaped distal end portion.

The under-cladding layer and the over-cladding layer to be used in the present invention are each made of a material having a lower refractive index than the cores. The material for forming the under-cladding layer is not particularly limited, and examples thereof include glass, silicon, metals, and resins. The under-cladding layer and the over-cladding layer are preferably made of the same material. The under-cladding layer may be constituted from a single layer or multiple layers. As the under-cladding layer, a glass panel or an optical film to be used for manufacturing a liquid crystal panel or a plasma panel may be used. The thickness of the under-cladding layer is preferably in the range of 5 μm to 10 mm, more preferably 20 μm to 5 mm.

The cores to be used in the present invention are made of a material having a higher refractive index than the under-cladding layer and the over-cladding layer. The cores are preferably made of a UV curable resin having excellent patterning properties. Preferred examples of such a UV curable resin include UV curable acrylic resins, UV curable epoxy resins, UV curable siloxane resins, UV curable norbornene resins, and UV curable polyimide resins or the like.

The maximum difference in refractive index between the core and the under-cladding layer and between the core and the over-cladding layer is preferably 0.01 or more, more preferably 0.02 to 0.2. The refractive index of a resin for forming the cores, the under-cladding layer, or the over-cladding layer can be increased or decreased by introducing an organic group appropriately selected into the resin or changing the organic group content of the resin. For example, the refractive index of the resin can be increased by, for example, introducing a cyclic aromatic group (e.g., a phenyl group) into a resin molecule or increasing a cyclic aromatic group content per resin molecule. On the other hand, the refractive index of the resin can be decreased by, for example, introducing a linear or cyclic aliphatic group (e.g., a methyl group or a norbornene group) into a resin molecule or increasing a linear or cyclic aliphatic group content per resin molecule.

The cross-sectional shape of each of the cores is not particularly limited, but is preferably trapezoidal or rectangular from the viewpoint of patterning properties. The width of the base of each of the cores is preferably 10 to 500 μm. The height of each of the cores is preferably 10 to 100 μm.

As described above, the over-cladding layer to be used in the present invention is made of a material having a lower refractive index than the cores, and has a lens-shaped distal end portion. The material for forming the over-cladding layer is not particularly limited, but is preferably a UV curable resin having excellent lens formability. Such a UV curable resin can be appropriately selected from, for example, the above-mentioned materials for forming the cores. The maximum thickness of the over-cladding layer is preferably 10 μm to 10 mm, more preferably 50 μm to 5 mm.

The lens-shaped distal end portion of the over-cladding layer is not particularly limited, but is preferably a convex lens. More preferably, as shown in FIG. 1, the lens-shaped distal end portion of the over-cladding layer is a long convex lens having a cross-sectional shape of substantially a quarter of a circle (which corresponds to a semi-lenticular lens). The curvature radius of the lens is preferably 0.3 to 5 mm, more preferably 0.5 to 3 mm.

Figure 3:
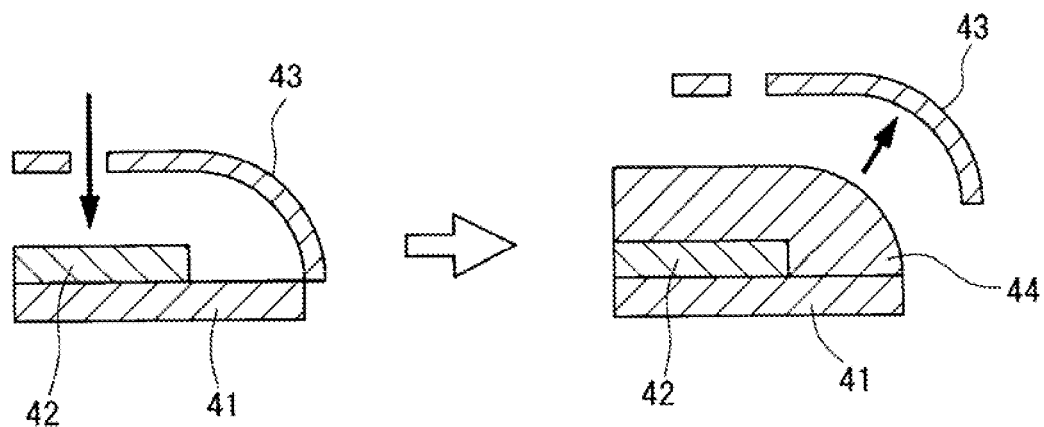
FIG. 3 is a diagram for explaining a method for forming an over-cladding layer.

The optical waveguides to be used in the present invention can be formed by any method, such as a dry etching method using plasma, a transfer method, an exposure and development method, or a photobleaching method or the like. The lens-shaped distal end portion of the over-cladding layer can be formed by, for example, the following method. As shown in FIG. 3, a plurality of cores 42 are formed by patterning on the surface of an under-cladding layer 41, and then a molding die 43 is placed on the surface of the under-cladding layer 41 so as to cover the entire cores 42. Then, a material for forming an over-cladding layer 44 is injected into the molding die 43 and solidified or cured, and then the molding die 43 is removed.

<Method for Manufacturing Optical Touch Panel>

Figure 4:
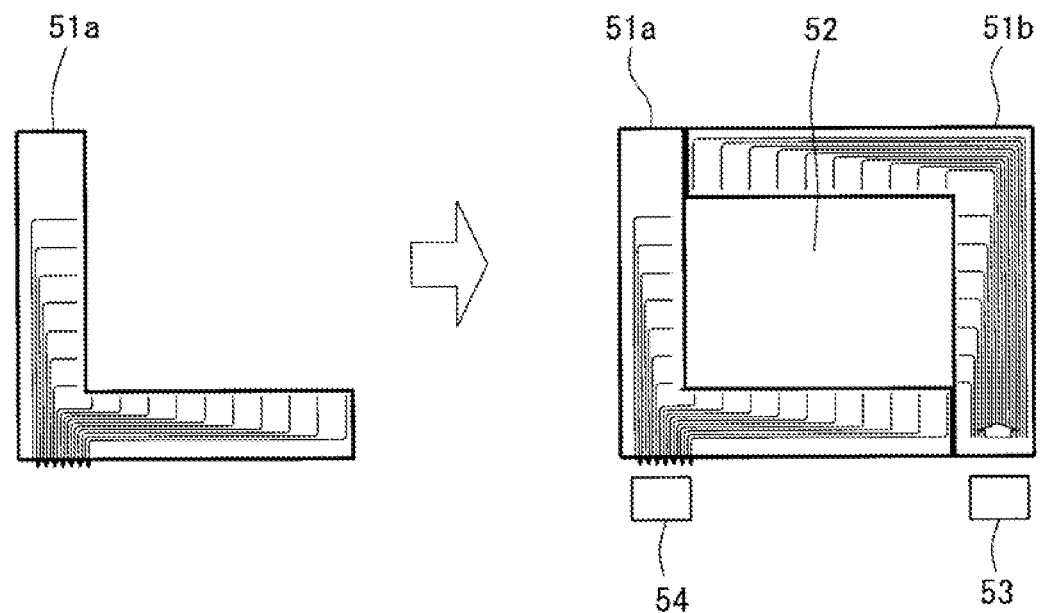
FIG. 4 is a diagram for explaining a method for manufacturing the optical touch panel according to the present invention.

The optical touch panel of the present invention can be manufactured by, for example, the following method. As shown in FIG. 4, two L-shaped optical waveguides 51a and 51b are first formed. Then, these two L-shaped optical waveguides 51a and 51b are arranged on the opposite sides of a coordinate input region 52. Then, one of the optical waveguides, that is, the optical waveguide 51b is connected to a light-emitting element 53 at the proximal ends of its cores, and the other optical waveguide, that is, the optical waveguide 51a is connected to a light-receiving element 54 at the proximal ends of its cores. According to such a manufacturing method, by forming optical waveguides by an exposure and development method, it is possible to manufacture an optical touch panel having a large area using a photo mask having a relatively small area.

A method for manufacturing the optical touch panel of the present invention is not limited to the above-described method in which L-shaped optical waveguides are assembled. For example, the optical touch panel of the present invention may be manufactured by assembling four I-shaped optical waveguides or using a frame-shaped optical waveguide requiring no assembly.

<Applications>

Examples of the application of the optical touch panel of the present invention include bank ATM systems, railway ticket-vending machines, search terminals in libraries, shop POS systems, operation panels of copiers and production facilities, electronic notepads, game machines, mobile phones, car navigation systems, and PC input systems or the like. The optical touch panel of the present invention is free from the fear that displacement of lenses will occur in principle, and therefore has higher impact resistance than conventional touch panels.

It is preferred that the optical touch panel of the present invention further comprises an input-output interface. The input-output interface is usually connected to the light-receiving element through a driver circuit. The input-output interface to be used in the present invention is not particularly limited, and examples thereof include a serial port, a USB port, and Ethernet®. Such an input-output interface may be either wired or wireless. Among these input-output interfaces, a USB port is preferred because it can be easily connected to a commercially available PC to supply electric power to the optical touch panel.

Figure 5:
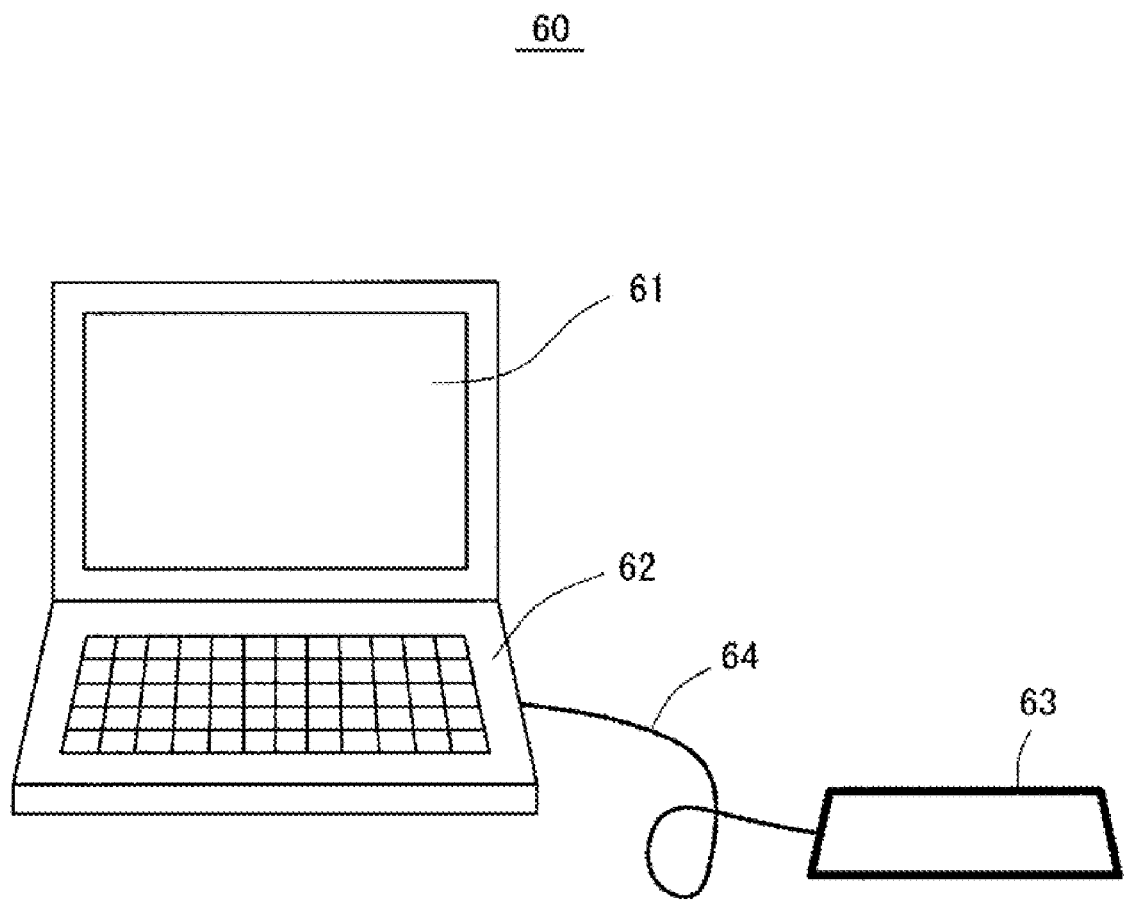
FIG. 5 is a schematic view of a computer apparatus according to the present invention.

FIG. 5 is a schematic view of a preferred embodiment of a computer apparatus 60 of the present invention. The computer apparatus 60 of the present invention includes a display panel 61, a main body 62, and an optical touch panel 63 of the present invention. The main body 62 and the optical touch panel 63 are connected to each other through an input-output interface 64.

EXAMPLES

<Preparation of Varnish for Forming Cladding>

A varnish for forming cladding was prepared by mixing 35 parts by weight of bisphenoxyethanolfluorene glycidyl ether (component A), 40 parts by weight of an alicyclic epoxy resin (CELLOXIDE 2021P manufactured by Daicel Chemical Industries, Ltd.) (component B), 20 parts by weight of an alicyclic epoxy resin having a cyclohexene oxide skeleton (CELLOXIDE 2081 manufactured by Daicel Chemical Industries, Ltd.) (component C), and 2 parts by weight of a 50% propione carbonate solution of 4,4'-bis[di(β-hydroxyethoxy)phenylsulfinio]phenylsulfide-bis-hexafluoroantimonate (component D).

<Preparation of Varnish for Forming Cores>

A varnish for forming cores was prepared by mixing 70 parts by weight of the component A, 30 parts by weight of 1,3,3-tris(4-(2-(3-oxetanyl)butoxyphenyl)butane, 1 part by weight of the component D, and 35 parts by weight of ethyl lactate.

<Formation of Optical Waveguide>

The varnish for forming cladding was applied onto the surface of a polyethylene naphthalate film having a thickness of 188 μm, irradiated with UV light at 2000 mJ/cm2, and thermally-treated at 100° C. for 15 minutes to form an under-cladding layer having a thickness of 20 μm. The refractive index of the under-cladding layer as measured at a wavelength of 830 nm was 1.542.

The varnish for forming cores was applied onto the surface of the under-cladding layer and thermally-treated at 100° C. for 15 minutes to form a core layer. Then, the core layer was covered with a photo mask, irradiated with UV light at 4000 mJ/cm2, and thermally-treated at 80° C. for 15 minutes. Patterning of the core layer was performed by dissolving away an unexposed portion of the core layer using an aqueous γ-butyrolactone solution and thermally treating the core layer at 120° C. for 30 minutes so that an L-shaped optical waveguide shown in FIG. 4 having cores each having a width of 15 μm and a height of 50 μm was obtained. The refractive index of each of the cores as measured at a wavelength of 830 nm was 1.588.

Then, a quartz molding die was placed on the surface of the under-cladding layer so as to cover the entire cores, and the varnish for forming cladding was injected into the molding die. The varnish for forming cladding was irradiated with UV light at 2000 mJ/cm2 through the molding die and thermally-treated at 120° C. for 30 minutes to form an over-cladding layer equipped with a long convex lens having a cross-sectional shape of a substantially quarter of a circle (i.e., a shape corresponding to a semi-lenticular lens) at its distal end. In this way, a light-emitting sided-L-shaped optical waveguide and a light-receiving sided-L-shaped optical waveguide were formed. The convex lens had a radius of curvature of 1.5 mm. The refractive index of the over-cladding layer as measured at a wavelength of 830 nm was 1.542.

<Preparation of Optical Touch Panel>

A VCSEL (manufactured by Optwell) emitting light having a wavelength of 850 nm was connected as a light-emitting element to one end of the light-emitting sided-L-shaped optical waveguide using a UV curable adhesive. On the other hand, a CMOS linear sensor array (manufactured by TAOS) was connected as a light-receiving element to one end of the light-receiving sided-L-shaped optical waveguide using a UV curable adhesive. In this way, an optical touch panel having a diagonal size of 3 inches was prepared.

<Production of Computer Apparatus>

A control unit of the light-receiving element of the optical touch panel was connected to a USB data acquisition unit (manufactured by National Instruments Corporation) through a flexible printed circuit board, and the USB data acquisition unit was connected to a computer through a USB port to produce a computer apparatus shown in FIG. 5.

<Evaluation>

Figure 6:
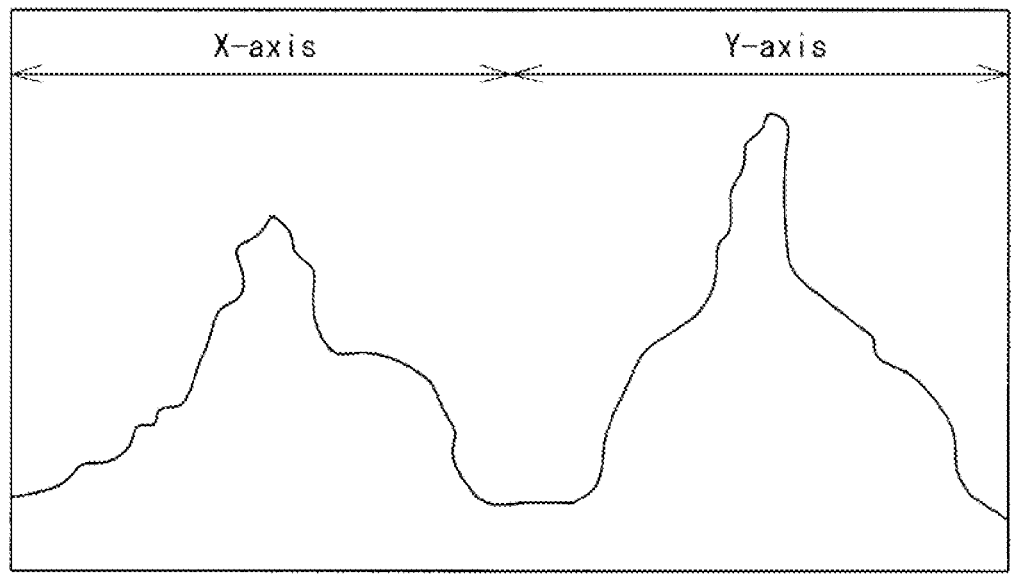
FIG. 6 is a graph showing the light intensity distribution of a light-receiving element.

Light having a wavelength of 850 nm and an intensity of 2 mW was emitted from the light-emitting element of the optical touch panel. The light passed through the light-emitting sided-optical waveguide, emitted therefrom through its output end, crossed the coordinate input region in a lattice pattern, entered the light-receiving sided-optical waveguide through its input end, passed through the light-receiving sided-optical waveguide, and reached the light-receiving element. FIG. 6 is a graph showing the intensity distribution of light received by the light-receiving element. In the graph shown in FIG. 6, the horizontal axis represents the position in the light-receiving element, and the vertical axis represents the intensity of light. Further, in this graph, the X-axis corresponds to the horizontal axis of the coordinate input region, and the Y-axis corresponds to the vertical axis of the coordinate input region.

Figure 7:
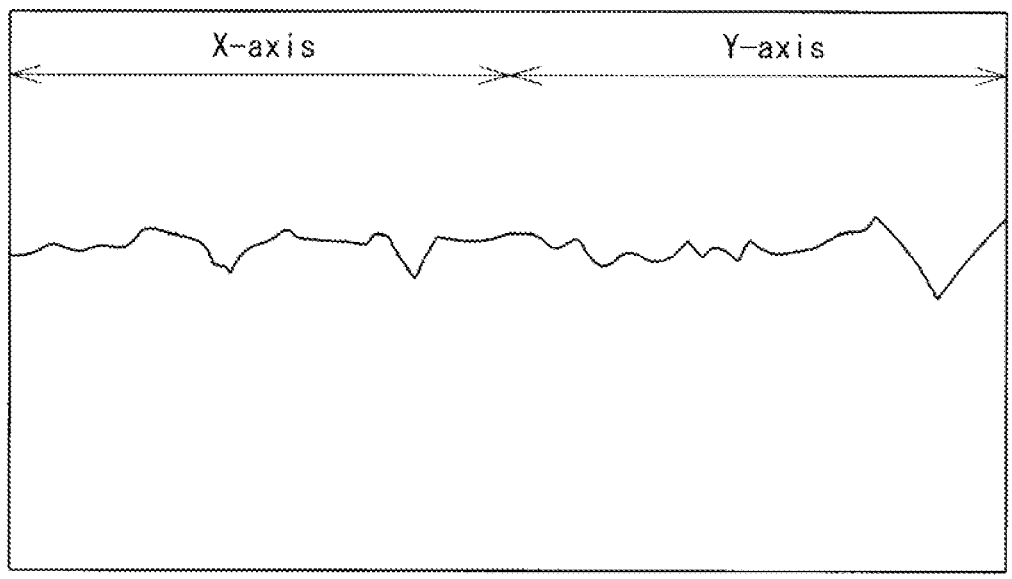
FIG. 7 is a graph obtained by normalizing the light intensity distribution shown in FIG. 6.
Figure 8:
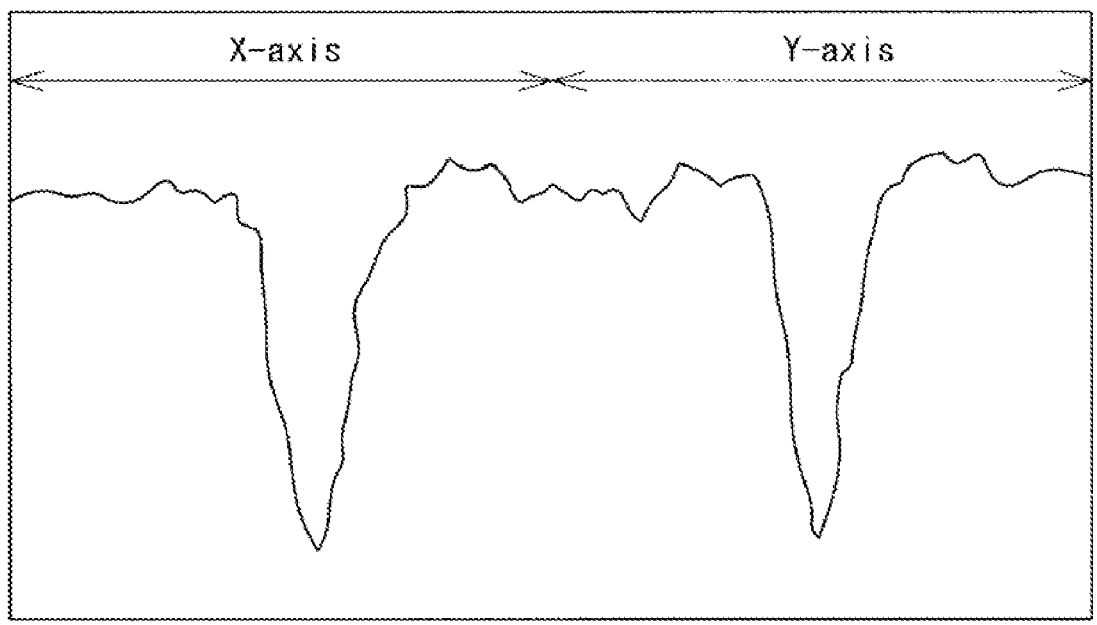
FIG. 8 is a graph showing the light intensity distribution of the light-receiving element obtained when part of light was blocked by a finger.

FIG. 7 is a graph obtained by normalizing the light intensity distribution data shown in FIG. 6. When part of light was blocked by touching the coordinate input region of the optical touch panel with a finger, as shown in FIG. 8, a reduction in light intensity was observed at the position where part of light was blocked by a finger. This result indicates that it is possible to detect the XY coordinates of the position of a portion of the coordinate input region of the optical touch panel of the present invention touched by a finger.

This application claims priority from Japanese Patent Application No. 2008-172517, which is incorporated herein by reference.

There have thus been shown and described a novel optical touch panel and a method for manufacturing the same which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical touch panel comprising:
    a coordinate input region;
    a light-emitting element;
    a light-receiving element;
    a light-emitting sided-optical waveguide connected to the light-emitting element and having an output end; and
    a light-receiving sided-optical waveguide connected to the light-receiving element and having an input end,
    wherein
    the output end of the light-emitting sided-optical waveguide and the input end of the light-receiving sided-optical waveguide are located on opposite sides of the coordinate input region,
    the light-emitting sided-optical waveguide has an under-cladding layer, a plurality of cores provided on the under-cladding layer, wherein the cores have distal ends, and an over-cladding layer covering the cores, including the distal ends of the cores, and the under-cladding layer, the under-cladding layer and the over-cladding layer of the light-emitting sided-optical waveguide have a lower refractive index than the cores of the light-emitting sided-optical waveguide, the over-cladding layer of the light-emitting sided-optical waveguide has an output end, the light-receiving sided-optical waveguide has an under-cladding layer, a plurality of cores provided on the under-cladding layer, wherein the cores have distal ends, and an over-cladding layer covering the cores, including the distal ends of the cores, and the under-cladding layer, the under-cladding layer and the over-cladding layer of the light-receiving sided-optical waveguide have a lower refractive index than the cores of the light-receiving sided-optical waveguide, the over-cladding layer of the light-receiving sided-optical waveguide has an input end, and at least one of the output end of the over-cladding layer of the light-emitting sided-optical waveguide and the input end of the over-cladding layer of the light-receiving sided-optical waveguide is a lens having a radius of curvature of 0.3 mm to 5 mm.

2. The optical touch panel according to claim 1, wherein light beams emitted from the distal ends of the cores of the light-emitting sided-optical waveguide are converted by the lens of the output end of the over-cladding layer into collimated light beams directed toward the input end of the light-receiving sided-optical waveguide, and the collimated light beams incident on the input end of the light-receiving sided-optical waveguide are converted by the lens of the input end of the over-cladding layer into convergent light beams directed toward the distal ends of the cores.

3. The optical touch panel according to claim 2, wherein the lens of the output end of the over-cladding layer and the lens of the input end of the over-cladding layer are each a long lens having a cross-sectional shape of substantially a quarter of a circle.

4. The optical touch panel according to claim 2, further comprising an input-output interface.

5. A computer apparatus comprising the optical touch panel according to claim 2.

6. A method for manufacturing the optical touch panel according to claim 2, comprising the steps of:
    forming the cores on a surface of the under-cladding layer by patterning;
    placing a molding die on the surface of the under-cladding layer so as to cover the cores;
    injecting a material for forming the over-cladding layer into the molding die; and
    solidifying or curing the material to form the over-cladding layer.

7. The optical touch panel according to claim 2, wherein the lens is a semi-lenticular lens.

8. The optical touch panel according to claim 1, wherein the lens of the output end of the over-cladding layer and the lens of the input end of the over-cladding layer are each a long lens having a cross-sectional shape of substantially a quarter of a circle.

9. The optical touch panel according to claim 1, further comprising an input-output interface.

10. A computer apparatus comprising the optical touch panel according to claim 1.

11. A method for manufacturing the optical touch panel according to claim 1, comprising the steps of:
    forming the cores on a surface of the under-cladding layer by patterning;
    placing a molding die on the surface of the under-cladding layer so as to cover the cores;
    injecting a material for forming the over-cladding layer into the molding die; and
    solidifying or curing the material to form the over-cladding layer.

12. The optical touch panel according to claim 1, wherein the lens is a semi-lenticular lens.

* * * * *